(12) United States Patent
Okada

(10) Patent No.: US 7,942,395 B2
(45) Date of Patent: May 17, 2011

(54) ROTARY CUTTING MAT

(75) Inventor: Shoji Okada, Osaka (JP)

(73) Assignee: Olfa Corporation, Osaka-shi (JP)

( * ) Notice: Subject to any disclaimer, the term of this patent is extended or adjusted under 35 U.S.C. 154(b) by 1028 days.

(21) Appl. No.: 11/212,255

(22) Filed: Aug. 26, 2005

(65) Prior Publication Data

US 2006/0060052 A1 Mar. 23, 2006

(30) Foreign Application Priority Data

Sep. 17, 2004 (JP) .................................. 2004-271195

(51) Int. Cl.
*B23Q 3/00* (2006.01)
(52) U.S. Cl. .................. 269/289 R; 269/302.1; 269/71; 269/57
(58) Field of Classification Search ................ 298/399.1, 298/131; 108/139, 99, 103; 269/284 R, 269/57, 71
See application file for complete search history.

(56) References Cited

U.S. PATENT DOCUMENTS

| 2,779,642 | A | * | 1/1957 | Matthews | .................. 248/349.1 |
| 5,479,867 | A | * | 1/1996 | Blevins et al. | .................. 108/94 |
| 2006/0060052 | A1 | * | 3/2006 | Okada | ............................. 83/659 |

FOREIGN PATENT DOCUMENTS

JP 3022789 4/1996

* cited by examiner

*Primary Examiner* — Lee D Wilson
(74) *Attorney, Agent, or Firm* — Crowell & Moring LLP

(57) ABSTRACT

A rotary cutting mat of the present invention has a base plate and a rotary mat, which can be rotated relative to each other. The rotary mat is provided with a shaft member projected from a reverse side thereof. The base plate is provided with a receiving portion, which rotatably receives the shaft member of the rotary mat. Since the rotary mat is simply placed on the base plate with the shaft member being inserted in the receiving portion, there is no need of a rivet for connecting the rotary mat and the base plate. Thus, the constitution on the mat is simplified and the surface of the mat can be maintained flat without any buried rivet head in the mat.

6 Claims, 2 Drawing Sheets

ROTARY CUTTING MAT

This application claims the priority of Japanese Patent Application No. 2004-271195, filed Sep. 17, 2004, the disclosure of which is expressly incorporated by reference herein.

BACKGROUND OF THE INVENTION

1. Field of the Invention

The present invention relates to a cutting mat, on which a sheet of paper, cloth or the like is cut with a cutter knife. In particular, the invention relates to a rotary cutting mat, wherein the upper face of the mat can be rotated to improve efficiency of cutting work.

2. Description of the Related Art

A rotary cutting mat having a rotatable upper face is known, for example from Japanese Utility Model Registration No. 3022789.

The rotary cutting mat disclosed in Japanese Utility Model Registration No. 3022789 comprises a base plate and a rotary mat, which are so connected to each other with a rivet, as to be rotatable relative to each other. The reverse side of the base plate is roughened, such that the base plate does not slide on a working table, unintentionally. The rotary mat is rotated on such the base plate. That is, an operator puts a sheet of paper, cloth or the like on the rotary mat and cuts the same.

Accordingly, with appropriately rotating the rotary mat depending on a cutting direction, the operator always can conduct the cutting operation in easy working posture, without moving himself. In this way, with the rotary cutting mat, the efficiency of cutting work can be improved.

However, the rotary cutting mat in Japanese Utility Model Registration No. 3022789 confronts the following problems, since a rivet member is used to connect the base plate and the rotary mat.

(1) Firstly, since a sheet of paper, cloth or the like to be cut is placed on the upper surface of the rotary mat, the head of the rivet should not be exposed on the upper surface of the rotary mat. This is because: if a rivet head is exposed on the upper surface of the rotary mat, the upper surface in such the region can not serve as a cutting mat. To solve this problem, the rotary mat is made up having a multi-layer structure, and the rivet head is buried in the multi-layer structure. Therefore, the structure of the mat becomes complicated, which increases the number of the components of the mat and the number of the manufacturing steps, resulting in higher cost.

(2) Secondary, a region of the upper surface of the mat corresponding to the rivet head buried in the multi-layer structure is slightly raised. Thus, the upper surface of the mat can not be kept in flat, and thus, cutting lines can be easily deflected on such the raised region of the mat.

SUMMARY OF THE INVENTION

It is therefore an object of the present invention to provide a rotary cutting mat which has a simple structure and thus can be manufactured at a lower cost, and which has a flat upper surface so as not to deflect cutting lines.

In order to achieve the objects of the present invention, there is provided a rotary cutting mat comprising a base plate and a rotary mat, which can be rotated relatively to each other; wherein the rotary mat is provided with a shaft member projected from a reverse side of the rotary mat, the base plate is provided with a receiving portion, which rotatably receives the shaft member, and the rotary mat is placed on the base plate, with the shaft member of the rotary mat being inserted in the receiving portion of the base plate.

In the rotary cutting mat of the present invention thus arranged, the rotary mat and the base plate are not connected to each other, but simply, the rotary mat is rotatably placed on the base plate. Thus, there is no need of a connector such as a rivet or the like for connecting the rotary mat and the base plate. As a result, there are not needed complicated manufacturing steps, i.e., the steps of making up the rotary mat having a multi-layer structure, and burying the rivet head in the multi-layer structure of the mat so as to prevent the exposure of the rivet head on the mat surface, and thus the number of relevant components are decreased. In other words, the rotary cutting mat of the present invention can be manufactured at lower cost with a simple manner.

In addition, there is no buried rivet in the rotary mat of the present invention, and therefore, the surface of the mat can be maintained flat without any raised region, so that any cutting lines are not deflected on such the raised region.

In the present invention, it is preferable that the shaft member of the rotary mat can be selectively attached to either the upper side or the reverse side of the rotary mat, for example, with a pressure sensitive adhesive double coated tape or the like.

When the rotary cutting mat is thus arranged, it becomes possible to effectively utilize the reverse side of the rotary mat, in addition to the primary use of the upper side of the rotary mat for a cutting operation.

The reverse side of the rotary mat may be used for a cutting operation like the upper side, or may be used for other purposes, for example, for clay work or the like. In the former case, preferably, both the upper side and the reverse side of the rotary mat are made of the same material. In the latter case, preferably, the upper side and the reverse side of the rotary mat are made of different materials. However, the materials for the upper side and the reverse side of the mat are not limited to particular ones, and can be conveniently selected.

BRIEF DESCRIPTION OF THE DRAWINGS

These and other objects and features of the present invention will become apparent from the following description taken in conjunction with the preferred embodiments thereof with reference to the accompanying drawings.

DETAILED DESCRIPTION OF THE PREFERRED EMBODIMENT

Figure 1:
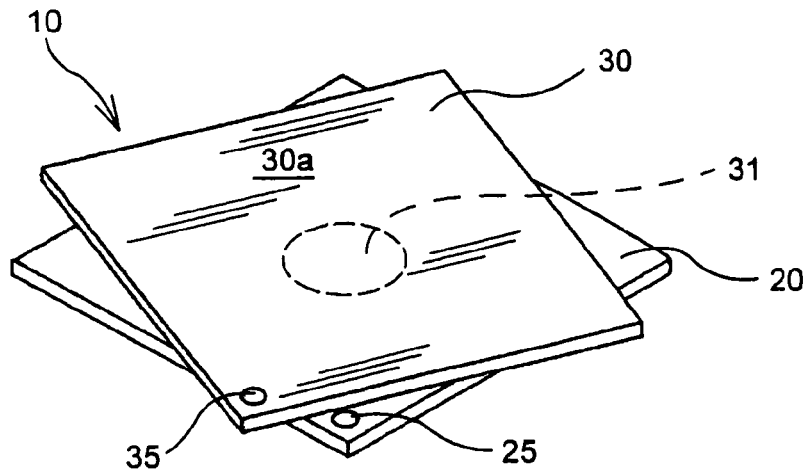
FIG. 1 is a perspective view of a rotary cutting mat according to an embodiment of the present invention.

The embodiments of the present invention will be explained in more detail with reference to the accompanying drawings. FIG. 1 shows a perspective view of a rotary cutting mat 10 according to an embodiment of the present invention.

Figure 2:
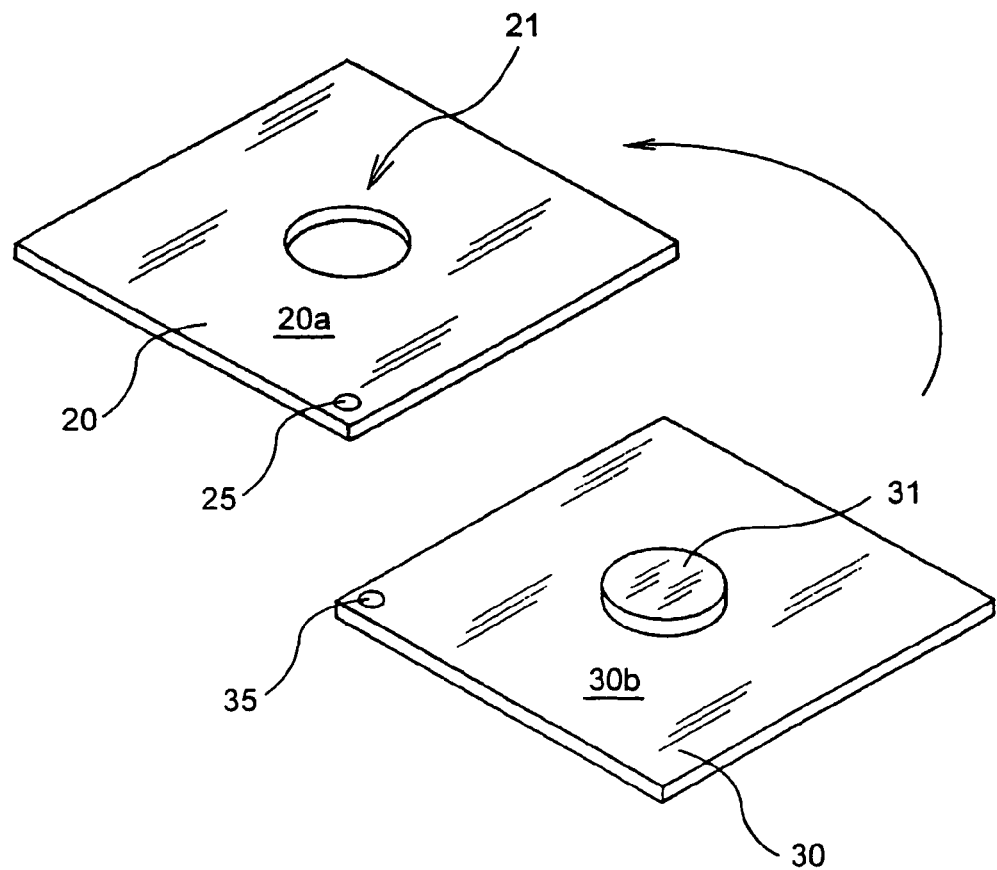
FIG. 2 is a perspective view showing the base plate and the rotary mat, which together constitute the rotary cutting mat shown in FIG. 1, in separated condition.

The rotary cutting mat 10 comprises a base plate 20 and a rotary mat 30, which are rotatable relative to each other. FIG. 2 shows the base plate 20 and the rotary mat 30, which are illustrated separately from each other for showing the upper surface 20a of the base plate 20, and the reverse side 30b of the rotary mat 30.

The base plate 20 has a circular opening 21 formed at its center, and the rotary mat 30 has a cylindrical shaft member 31 at its reverse side 30b. As indicated by the arrow in FIG. 2, the rotary mat 30 is placed on the base plate 20 with its shaft member 31 inserted in the circular opening 21 of the base plate.

In this way, the rotary mat 30 is simply placed on the base plate 20 without any rivet or the like for connecting both of them.

The circular opening 21 and the shaft member 31 are formed having substantially the same diameters, respectively, so that the shaft member 31 is smoothly rotatable in the circular opening 21 of the base plate. Accordingly, the rotary mat 30 can be smoothly rotated on the base plate 20.

For rotating the rotary mat 30 on the base plate 20, the shaft member 31 is not necessarily cylindrically formed as shown in FIG. 2, and it can be formed in the shape of a polygonal prism inscribed in the circular opening, or it may be composed of a plurality of small pins disposed circularly.

Figure 3:
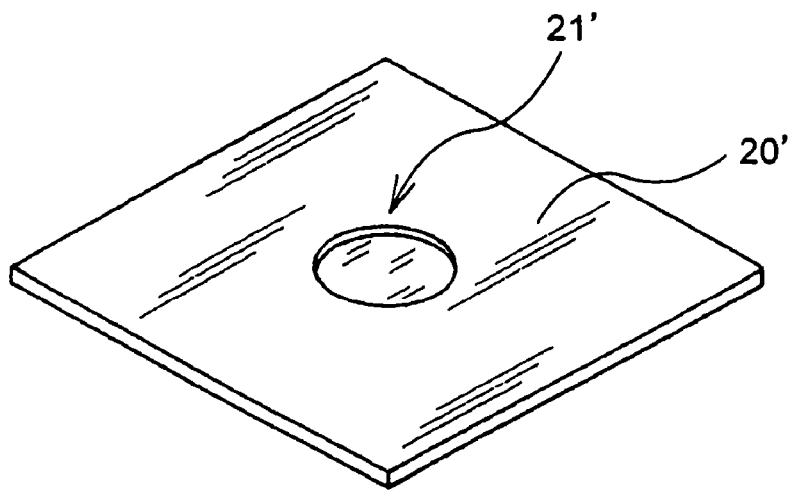
FIG. 3 is a perspective view of a modified base plate.

On the other hand, the opening 21 in the base plate 20 is necessarily formed in a circular shape so as to rotatably receive the shaft member. But, instead of the opening 21, a bottomed circular recess 21' can be employed for rotatably receiving the shaft member, as is employed in a base plate 20' of FIG. 3.

Figure 4:
FIG. 4 is a perspective view of a removable shaft member.

The shaft member 31 may be either unremovably fixed on the reverse side of the rotary mat 30, or may be removably secured to the reverse side of the rotary mat 30 with a pressure sensitive adhesive double coated tape or the like. As shown in FIG. 4, a cylindrical shaft member 31 as a separate member, which is not necessarily formed cylindrically as mentioned above, may be attached selectively on either the upper side 30a or the reverse side 30b of the rotary mat 30, with a pressure sensitive adhesive double coated tape.

Thus arranged, it becomes possible to utilize both the upper side 30a and the reverse side 30b of the rotary mat 30.

In this case, both sides of the rotary mat 30 may be used for cutting operations, or may be used for different purposes: for example, the upper side of the rotary mat may be used for a cutting operation, and the reverse side may be used for clay work or the like. When both sides of the rotary mat are used for cutting operations, different patterns may be provided on both sides.

Many advantages can be enjoyed when both sides of the rotary mat are used, that is, one rotary cutting mat can be variously used when both sides are used for different purposes, while the lifetime as a cutting mat can be prolonged when both sides are used for cutting operations.

Figure 5:
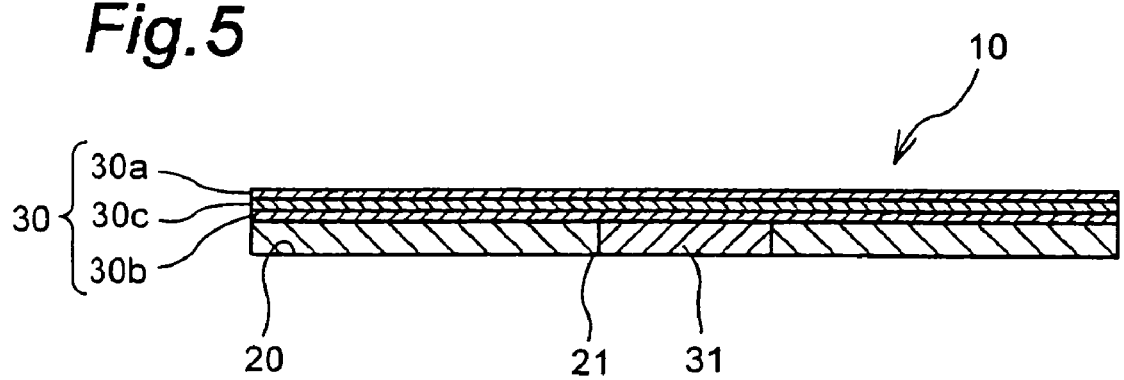
FIG. 5 is a sectional view of the rotary cutting mat shown in FIG. 1.

FIG. 5 shows a sectional view of the rotary cutting mat, wherein the base plate 20 and the rotary mat 30 are assembled. The shaft member 31 fixed on the reverse side 30b of the rotary mat 30 is inserted in the opening 21 of the base plate 20.

In the embodiment shown in FIG. 5, the rotary mat 30 has a three-layer structure, wherein the uppermost layer 30a, i.e., the upper side of the rotary mat 30, is made of a soft vinyl chloride material suitable for use in a cutting operation; the lowermost layer 30b, i.e., the reverse side of the rotary mat 30, is also made of a soft vinyl chloride material suitable for use in a cutting operation; and the intermediate layer 30c is made of a hard vinyl chloride material, serving as a core material for imparting appropriate strength to the rotary mat 30.

The layer structure of the rotary mat 30 shown in FIG. 5 is intended for a case where both sides of the mat are used for cutting operations. That is, the shaft member 31 is removably attached to the reverse side 30b of the rotary mat with a pressure sensitive adhesive double coated tape. For example, when the upper side 30a of the rotary mat has been worn out, the shaft member 31 is, in turn, attached to the upper side 30a of the rotary mat, to thereby use the reverse side 30b of the rotary mat for cutting operation.

When both sides of the rotary mat 30 are used for cutting operations, it is preferable to form the both sides of the same material. On the other hand, when the reverse side 30b of the rotary mat 30 is intended for different use such as clay work or the like, it is preferable to form the reverse side 30b of a material suitable for the intended use.

In the present invention, however, the materials for the rotary mat 30 and other components are not particularly limited, and can be appropriately selected. For example, olefin-based elastomer resins can be used instead of the vinyl chloride materials. Note that, the intermediate layer 30c as the core material can be omitted. Thus, rotary mat 30 can have a single-layer structure when both sides of the rotary mat 30 are used for cutting operations.

In any of the rotary cutting mats of the present invention, no rivet is used. Thus, there is no need for burying a rivet head in the layer structure of the rotary mat. Therefore, the rotary cutting mats of the present invention can be manufactured by a simple manner and at lower cost. Moreover, the surface of the mat is not raised due to the buried head of a rivet.

In the embodiments shown in FIGS. 1 and 2, the rectangular base plate 20 and rotary mat 30 have through holes 25 and 35 at their corner portions, respectively. The through hole 35 of the rotary mat 30 serves as an engagement portion, on which an operator puts his finger to rotate the same. In order to realize the function of the engagement portion, however, the engagement portion is not necessarily a through hole, but may be a concave or a convex portion, or otherwise, a piece of rubber may be applied on such a portion, or such a portion may be surface-roughened, so as to engage with the operator's finger.

When the through hole 35 is formed on the rotary mat 30 as the engagement portion, this through hole 35 can cooperate with another through hole 25 formed on the base plate 20, together to serve as one hole for hanging up the rotary mat.

That is, the through hole 25 is formed at such a position on the base plate 20 that the through hole 25 can be superimposed on the through hole 35 on the rotary mat 30 when the base plate 20 is aligned with the rotary mat 30. In other words, two through holes 25 and 35 are aligned with each other to form one through hole which penetrates the mat and the base plate. With a hook or the like passed through the through hole, the rotary cutting mat 10 can be hung up when not in use.

On the base plate 20 and the rotary mat 30, respectively, the engagement portion or the through hole can be formed at only one position or at a plurality of positions.

Although, in the illustrated embodiments, the base plates 20 and the rotary mats 30 are all formed in rectangular shapes, they are not necessarily formed rectangular, and can be formed in circular or other shapes. In such a case, the engagement portion for rotating the rotary mat, or the through hole for hanging the same, may be provided near the outer peripheral region of the base plate or the rotary mat.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A rotary cutting mat, comprising:
a base plate and a rotary mat, which can be rotated relative to each other;
wherein the rotary mat is provided with a shaft member projected from a reverse side of the rotary mat,
wherein the base plate is provided with a receiving portion, which rotatably receives the shaft member, and
wherein the rotary mat is placed directly on the base plate without any structure disposed therebetween, with the shaft member of the rotary mat being inserted in the receiving portion of the base plate.

2. The rotary cutting mat of claim 1, wherein the shaft member of the rotary mat is selectively attachable to an upper side or to a reverse side of the rotary mat.

3. The rotary cutting mat of claim 2, wherein the upper side and the reverse side of the rotary mat are made of a same material.

4. The rotary cutting mat of claim 2, wherein the reverse side of the rotary mat is made of a different material from the upper side, so that the reverse side is intended for a use other than that of the upper side.

5. The rotary cutting mat of claim 1, wherein an engagement portion is provided near an outer peripheral region of the rotary mat, the engagement portion being intended to be engaged with a finger of a user to be rotated.

6. The rotary cutting mat of claim 5, wherein the engagement portion is a through hole, and another through hole is provided on the base plate at a location aligning with the through hole on the rotary mat.

* * * * *